United States Patent Office 2,697,252
Patented Dec. 21, 1954

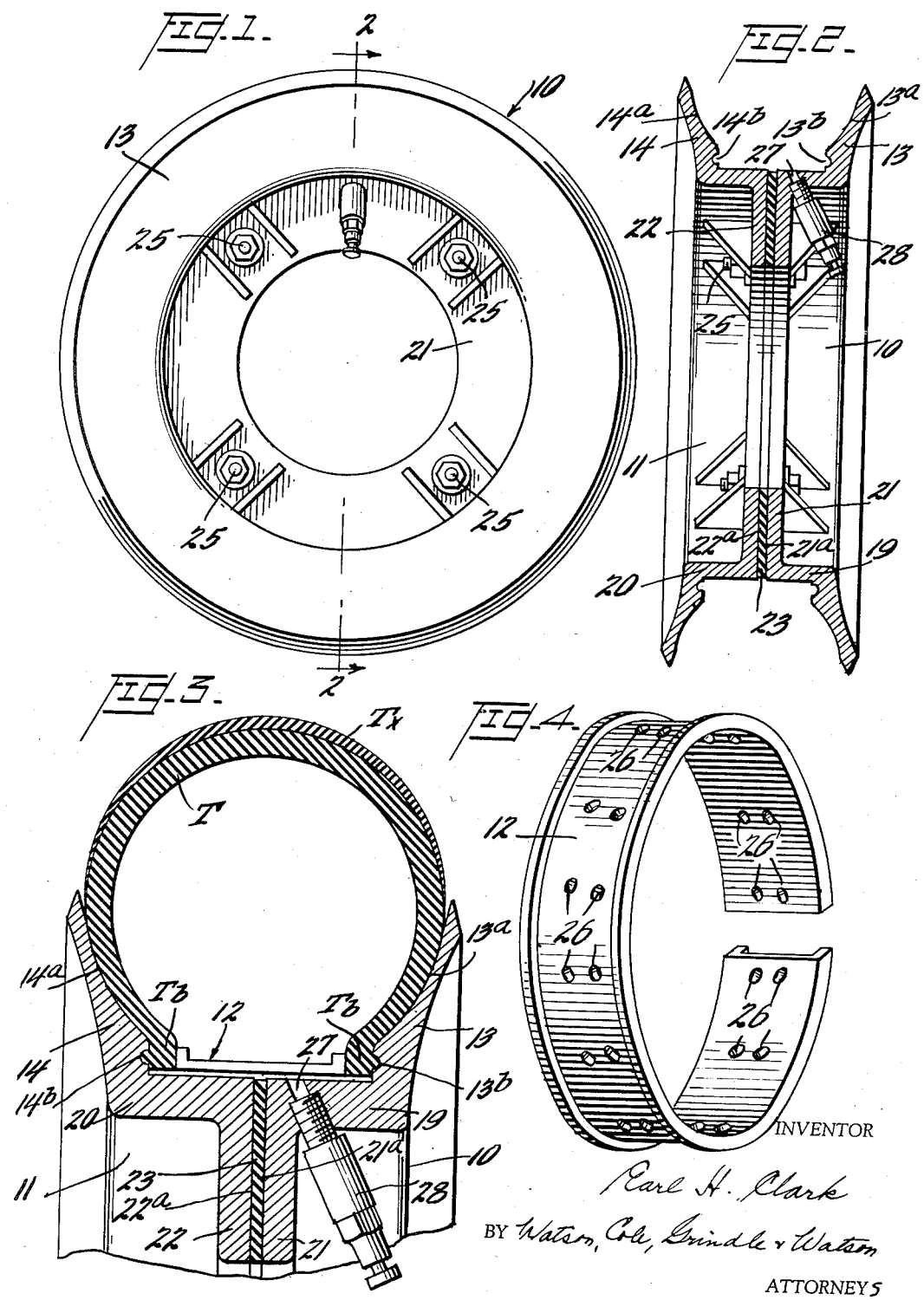

2,697,252

TIRE RETREADING EQUIPMENT

Earl H. Clark, Gainesville, Ga.

Application December 31, 1951, Serial No. 264,305

1 Claim. (Cl. 18—18)

This invention relates to tire retreading or repairing equipment and particularly to a device primarily designed to support an inflated tubeless tire during the time that that tire is positioned in a vulcanizing apparatus.

Numerous types of apparatus for effecting the repair or retreading of used motor vehicle tires by vulcanizing procedures have heretofore been designed and many such are in daily use. Each such machine ordinarily comprises, in addition to the usual vulcanizing means, a tire support or core upon which a tire may be mounted and which, with the tire thereon, is then placed in the vulcanizing apparatus, maintained in the apparatus during the vulcanization, and finally removed. The completed tire is then removed from the core. The core or support should be of such character that it may be adapted, by adjustment if necessary, for the mounting of tires of different sizes and which vary in other characteristics. Many such tire supporting cores which have heretofore been provided and used with success are of complicated nature and construction, imperfect in functioning and costly to use in that excessive amounts of an attendant's time are required to mount the tire on the support, place it in the vulcanizing apparatus and thereafter remove and dismount the repaired tire.

The tubeless tire is becoming increasingly popular but there has been developed up until this time no commercially acceptable tire support or core upon which a tubeless tire may be adequately supported during vulcanization without the aid of a pneumatic tube or the like in the nature of a tire filler or insert which functions to maintain the wall of the tire properly distended and shaped during the vulcanization operation. Such inserts are costly, awkward to handle, and short lived, deteriorating rather rapidly when subjected to repeated heatings at the high temperatures incident to retreading operations.

It is the purpose of the present invention to provide an improved core or support primarily for tubeless tires and by means of which such a tire may be given maximum support and protection while vulcanization operations are being carried out, which may be manipulated with facility in the mounting of a tire thereon and in the removal of a tire on completion of vulcanization, and which is also of such character as to render wholly unnecessary the usual inserts provided for maintaining the tubeless tire in distended condition during vulcanization.

In the accompanying drawings a preferred embodiment of the invention is illustrated. It will be appreciated that minor alterations in shape and design of the component elements of the device may be effected without departure from the invention.

In the drawings:

Figure 1 is a side elevation of the core or tire support;
Figure 2 is a section on line 2—2 of Figure 1;
Figure 3 is an enlarged transverse section through portion of the tire support, showing in section a tire mounted thereon; and
Figure 4 is a perspective view of a spacing member forming portion of the apparatus.

The device comprises essentially two complementary annular members indicated at 10 and 11, respectively, together with a spacer formed as an interrupted cylinder, indicated at 12, and means associated with the complementary members 10 and 11 for securing these members together in tire supporting relation, in which relation they are illustrated in Figures 1, 2 and 3.

Each such annular member includes a continuous tire side wall engaging portion, one of these being indicated at 13 and the other at 14, and integral therewith a second continuous portion of less diameter, substantially L-shaped in cross-section. As will be observed upon an inspection of Figures 2 and 3, the tire side wall engaging portions 13 and 14 of the annular members 10 and 11 diverge outwardly and the mutually facing inner faces 13a and 14a of these portions are concavely curved to receive with a snug fit the convex side surfaces of a tire, such as indicated at T, which will be mounted upon the support. The tire side wall supporting portions 13 and 14 of the core are relatively deep, measured radially of the device, and provide supports for the side walls of the tire T substantially to the point where the tread Tx begins.

The second or inner portions of the complementary annular members 10 and 11 may be formed in various ways but I prefer to make each substantially L-shaped as shown in the drawings, with transversely extending web portions indicated at 19 and 20 respectively, and, integral therewith, radially extending continuous flat annular portions 21 and 22, respectively. The flange-like portions 21 and 22 are provided with mutually facing surfaces 21a and 22a and a gasket of rubber, or aluminum or other suitable soft metal, indicated at 23, is interposed between surfaces 21a and 22a. A series of securing bolts 25, of which there may be four or more, is provided for detachably securing the two annular members 10 and 11 rigidly together in the relationship in which they are shown in Figures 2 and 3, each such bolt passing through registering apertures in the flange-like portions 21 and 22 and the intermediate spacer or gasket 23. By securing devices of this nature the two parts of the support may be readily assembled and disassembled.

The annular spacer 12 is interposed between the free edges or bead portions Tb of the tire during the assembly operation and, when the bolts are tightened with the spacer in the position shown in Figure 3 of the drawings, the outer faces of each bead Tb will be pressed tightly against the inner surface of the associated tire side wall supporting portions 13 and 14, these portions being grooved as at 13b and 14b to receive any exterior rib which may have been formed on the adjacent bead of the tire. It will be observed that the spacer 12 is provided with apertures 26 so that air, which can be introduced into the closed space defined by the tire and its supporting core through a port 27 with which a valved air inlet tube 28 communicates, may readily pass to the interior of the tire and thus permit its ready inflation. The spacer is positioned in the tire with its adjacent ends on opposite sides of the valve or opening through which air under pressure is introduced.

A tire supporting device such as illustrated in the drawings will support any one of a number of tires which vary in outside diameter, although not in width. Tires which are wider may be placed upon the core and readily clamped in position as shown in Figure 3, by substituting for the sealing member 23 a metallic sealing member of greater width. An annular ring of aluminum of the desired width may be placed between the annular flange-like portions 21 and 22 of the annular members and longer securing bolts may be employed. Sealing discs of soft aluminum will adequately prevent the escape of air while at the same time serving as spacing shims or elements which permit the support to be readily adjusted in width.

Having thus described the invention, what is claimed as new and desired to be secured by Letters Patent is:

A device for supporting a tubeless tire having tread side-wall portions in inflated condition during a retreading or repairing operation comprising, in combination, two complementary annular members each having a tire side wall engaging portion which is deep when measured radially of such annular member and so formed that substantially all of a tire side-wall is engaged and supported thereby and a second portion of less diameter integral therewith, means for detachably maintaining the said second portions of said respective members in fixed relationship to form a rigid air-tight connection between said first portions and to define, with said first portions and a tire having its side wall surfaces engaged by said first portions, a closed space in which air under pressure may be maintained, means for passing air under pressure through one of said members into any closed space thus formed, and a cylindrical spacing means disposed intermediate the first or tire wall engaging portions of said device to maintain the side walls of any tire mounted on said device in contact with the said side wall engaging portions of the device, said spacing means being permeable to the passage of air.

References Cited in the file of this patent

UNITED STATES PATENTS

| Number | Name | Date |
|---|---|---|
| 2,380,380 | Bacon, Jr. | July 31, 1945 |
| 2,479,493 | Horton-Wellings | Aug. 16, 1949 |

FOREIGN PATENTS

| Number | Country | Date |
|---|---|---|
| 958,352 | France | Mar. 8, 1950 |